(12) United States Patent
Razzell et al.

(10) Patent No.: US 7,637,096 B2
(45) Date of Patent: Dec. 29, 2009

(54) PULSE JET ENGINE HAVING PRESSURE SENSOR MEANS FOR CONTROLLING FUEL DELIVERY INTO A COMBUSTION CHAMBER

(75) Inventors: Anthony G Razzell, Derby (GB); Mark D Taylor, Derby (GB); Samuel A Mason, Stoke-on-Trent (GB); Robert J Miller, Cambridge (GB)

(73) Assignee: Rolls-Royce plc, London (GB)

( * ) Notice: Subject to any disclaimer, the term of this patent is extended or adjusted under 35 U.S.C. 154(b) by 785 days.

(21) Appl. No.: 11/262,930

(22) Filed: Nov. 1, 2005

(65) Prior Publication Data

US 2006/0112672 A1 Jun. 1, 2006

(30) Foreign Application Priority Data

Nov. 25, 2004 (GB) ................... 0425901.6
Oct. 6, 2005 (GB) ................... 0520278.3

(51) Int. Cl.
*F02K 5/02* (2006.01)
(52) U.S. Cl. ........................ 60/247; 60/39.38
(58) Field of Classification Search .......... 60/247, 60/39.38, 39.76
See application file for complete search history.

(56) References Cited

U.S. PATENT DOCUMENTS

| 2,587,100 | A | * | 2/1952 | Black et al. | 60/247 |
|---|---|---|---|---|---|
| 2,612,748 | A | * | 10/1952 | Tenney et al. | 60/266 |
| 2,674,091 | A | * | 4/1954 | Malick | 60/39.77 |
| 2,710,524 | A | * | 6/1955 | Frank et al. | 60/786 |
| 2,795,105 | A | * | 6/1957 | Porter | 60/249 |
| 2,919,542 | A | * | 1/1960 | Servanty et al. | 60/249 |
| 2,950,592 | A | * | 8/1960 | Frank | 60/247 |
| 3,332,236 | A | * | 7/1967 | Kunsagi | 60/39.39 |
| 3,456,441 | A | * | 7/1969 | Graber | 60/247 |
| 3,462,955 | A | * | 8/1969 | Graber et al. | 60/249 |
| 3,533,239 | A | * | 10/1970 | Ghougasian | 60/244 |
| 4,173,122 | A | * | 11/1979 | Wilkinson | 60/247 |
| 4,232,515 | A | * | 11/1980 | Brown | 60/204 |
| 5,361,710 | A | | 11/1994 | Gutmark | |
| 5,694,760 | A | * | 12/1997 | Baxter | 60/773 |
| 5,791,889 | A | * | 8/1998 | Gemmen et al. | 431/1 |
| 5,864,517 | A | * | 1/1999 | Hinkey et al. | 367/145 |
| 7,047,724 | B2 | * | 5/2006 | Nordeen et al. | 60/226.1 |
| 7,275,361 | B2 | * | 10/2007 | Muramatsu et al. | 60/39.281 |
| 7,406,820 | B2 | * | 8/2008 | Critchley et al. | 60/39.281 |

FOREIGN PATENT DOCUMENTS

JP 8 226 338 AB 9/1996

* cited by examiner

*Primary Examiner*—William H Rodriguez
(74) *Attorney, Agent, or Firm*—Jeffrey S. Melcher; Manelli Denison & Selter PLLC

(57) ABSTRACT

A pressure rise combustor is provided with fuel provided at intermittent periods. The fuel is pulsed at timings such that the phase lag between the addition of the fuel and a resultant pressure rise is minimized. The fuel is pulsed such that the unsteady addition of heat reinforces the amplitude of an unsteady pressure fluctuation.

7 Claims, 3 Drawing Sheets

PULSE JET ENGINE HAVING PRESSURE SENSOR MEANS FOR CONTROLLING FUEL DELIVERY INTO A COMBUSTION CHAMBER

FIELD OF THE INVENTION

This invention relates to pressure rise combustors and in particular thermo acoustic pressure rise combustors and valve-less pulse combustors.

BACKGROUND OF THE INVENTION

Combustion chambers fall into two categories: constant pressure and pressure rise. In a constant pressure combustor fuel at steady state is continually combusted and the hot exhaust gas allowed to expand without constraint. While there may be some pressure loss or pressure fluctuations due to resonance within the chamber these variations are kept small. Examples of constant pressure combustors are: turbo-annular combustors for gas turbines, ram jets or dump combustors. Such combustors are not said to be thermo acoustic.

In a pressure rise combustor the pressure within the combustor varies widely and in a periodic manner. A pressure rise combustor utilises unsteady combustion to produce an exhaust gas stream which has a higher mechanical energy, or stagnation pressure, than that of the inlet stream. The produced mechanical energy can be extracted as, for example, thrust or shaft work. Pressure rise combustors may be further divided into thermo acoustic combustors, where at least the outlet of the combustion chamber is open to atmosphere and the acoustics of the combustor are such that deflagration of the fuel/air mixture acts against an induced pressure wave to further increase the pressure in the chamber, and mechanical combustors in which the fuel/air mixture is constrained within an enclosed combustor and deflagration or detonation of the fuel/air mixture acts against a piston or other mechanical device. Pressure rise combustors may be used to provide propulsion. An example of a thermo-acoustic pressure rise combustor is a pulse-jet.

A pressure rise combustion system may be applied to a gas turbine and offers a potentially increased thermodynamic performance. In a conventional gas turbine combustion chamber, i.e. non pressure rise, there is a pressure loss of typically 5% of the engine overall pressure ratio and there is no conversion of thermal energy to mechanical energy.

In a pressure-rise combustor there is a stagnation pressure rise due to the conversion of chemical energy into mechanical energy. Pressure-rise combustion can be used with solid, liquid or gaseous fuels.

A pulse-jet may be valved or valve-less and utilise unsteady combustion in an acoustically resonant combustion chamber to produce a pressure rise. Fuel is steadily supplied to the combustion chamber and the timing of the unsteady combustion heat release is dictated by the aero-thermo-acoustical coupling in the working fluid. The phase angle and amplitude of the unsteady heat release is governed by the internal fluid mechanics of the system i.e. temporal and spatial variations of mixing processes, strain rates, convection of reactants and ignition sources. The combustion chambers burn the fuel in a deflagration process rather by detonation. The deflagration enables the combustion process to be self-sustaining in that once initial ignition is effected the acoustics within the system generate a cyclical combustion process without requiring further energy input to re-ignite an injected air/fuel mixture. This is in contrast to detonation combustors where an air/fuel mixture is detonated through input from an external energy source such as a spark plug, the chamber evacuated of the products of the detonation, a new air/fuel mixture supplied to the chamber and detonated through input from the external energy source. Each combustion event can be said to be isolated from an earlier and subsequent combustion event and consequently significant energy must be input by the spark plugs to ensure operation of the combustor for a sustained period.

SUMMARY OF THE INVENTION

It is an object of the invention to seek to provide an improved thermo acoustic deflagration combustion device. According to an aspect of the present invention there is provided a thermo acoustic pressure rise combustor having an air inlet, an air outlet, a combustion chamber and an associated fuel injector from which in use fuel is injected into the combustor chamber in pulses, the combustor chamber in use exhibiting a cyclical pressure fluctuation having a pressure rising portion and a pressure falling portion induced by deflagration of the fuel, the timing of the start of the pulse of fuel being in a phase relationship with the pressure rising portion.

The fuel flow may be pulsed such that the fuel addition and/or heat addition to the combustor is non-sinusoidal.

The fuel may be pulsed at the same frequency as the pressure fluctuations.

The cyclical pressure fluctuation may be sinusoidal, the pressure rising portion starting at the minima of the sinusoidal pressure fluctuation and extending to the maxima of the sinusoidal pressure fluctuation, the pressure falling portion starting at the maxima of the sinusoidal pressure fluctuation and extending to the minima of the sinusoidal pressure fluctuation, wherein the timing of the start of the pulse of fuel is phased from the minima by between 0° and 210°, and preferably by between 90° and 210°.

The timing of the end of the pulse of fuel may be phased from the timing of the start of the pulse of fuel by a phase angle of between 30° and 180°. The phase delay of the timing of the start of fuel injection may vary between cycles.

The thermo acoustic pressure rise combustor may further comprising pressure sensing means for sensing the pressure within the combustor chamber. Preferably the pressure sensor is functionally connected to the fuel injector such that fuel is pulsed in response to a sensed pressure value within the combustor casing.

According to a second aspect of the present invention there is provided a method of operating a thermo acoustic pressure rise combustor comprising the steps introducing air and fuel into the combustor and inducing the air and fuel to ignite and deflagrate thereby creating a cyclical pressure fluctuation and pulsing fuel into the injector at the same frequency as the pressure fluctuation.

According to a third aspect of the present invention there is provided a method of operating a thermo acoustic pressure rise combustor comprising the steps introducing air and fuel into the combustor, creating a cyclical pressure fluctuation by inducing the air and fuel to ignite and deflagrate, measuring the pressure in the combustor and pulsing fuel into the injector at a phase angle delay of between 0° and 210° to the minima of the pressure fluctuation.

Thermal efficiency is the quantity of mechanical energy that is extracted from combustion products divided by the quantity of heat liberated to the fluid through combustion. This is different to combustion efficiency which is defined as the quantity of heat liberated to the fluid through combustion divided by the calorific content of the fuel.

Beneficially, the conversion of chemical energy into mechanical energy within the system can be improved and thus the thermal efficiency of the system is improved.

Preferably the fuel is pulsed at a defined phase relationship with the pressure rise. Preferably the heat addition to the combustor is non-sinusoidal. Preferably the phase relationship is allowed to vary and can be controlled.

The pressure-rise combustor may be a valve-less pulse combustor and may be used as a combustor for a gas turbine, for direct propulsion, for pumping, for power generation or in the bypass duct of a turbofan engine.

The pressure-rise combustor may be a valved pulse combustor and may be used as a combustor for a gas turbine, for direct propulsion, for pumping, for power generation or in the bypass duct of a turbofan engine.

The pressure-rise combustor may be a pulse detonation engine and may be used as a combustor for a gas turbine, for direct propulsion, for pumping, for power generation or in the bypass duct of a turbofan engine.

BRIEF DESCRIPTION OF THE DRAWINGS

The invention will now be described, by way of example only, with reference to the following figures, in which.

DETAILED DESCRIPTION OF THE INVENTION

Figure 1:
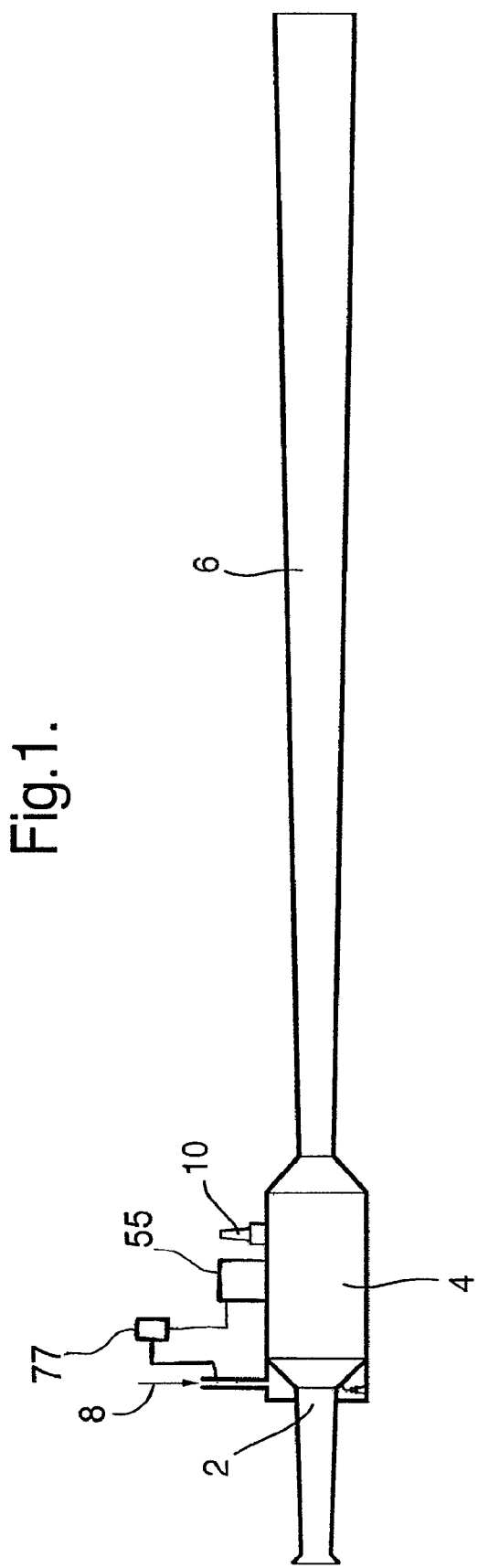
FIG. 1 depicts a valve-less pulse-jet combustor.
Figure 2:
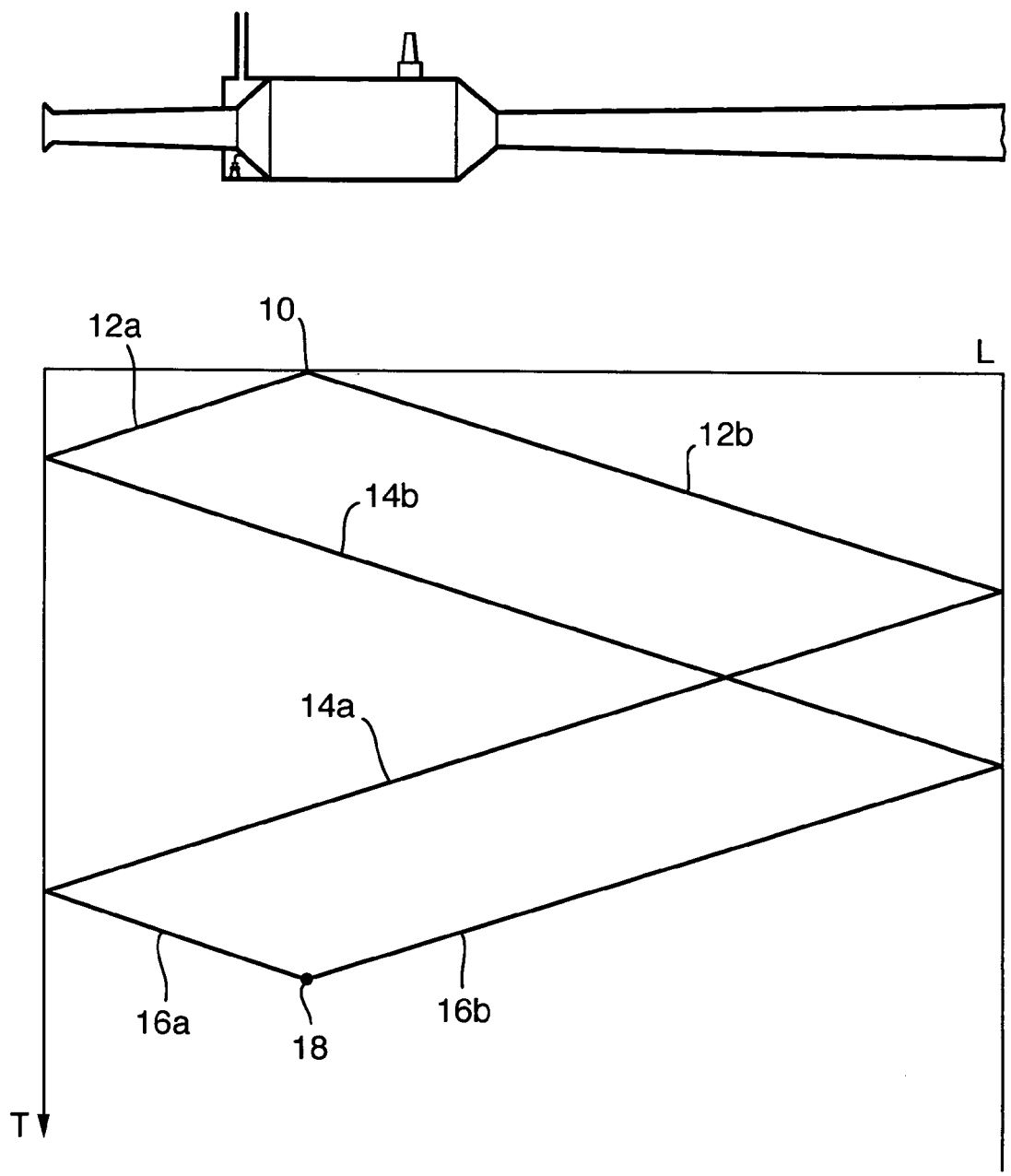
FIG. 2 depicts a pressure wave response in time of the combustor of FIG. 1.

The valve-less pulse-jet of FIG. 1 comprises an air inlet 2, a combustion chamber 4 and a tailpipe 6. Air enters the combustion chamber from the air inlet 2 and fuel is injected from a fuel injector 8. An igniter 10 is initially used to ignite the air/fuel mixture in the combustion chamber.

Where a fuel and air mixture is ignited in the chamber in a deflagration process a pressure wave is initiated that travels within the combustion chamber 4, tailpipe 6 and air inlet 2 as depicted in FIG. 2. The fuel is ignited at point 10 and this induces a pressure wave that travels axially forward 12a and axially rearward 12b. At the open ends of the inlet and tailpipe the pressure wave reflects and expansion waves 14a, 14b travel back along the combustion device to the opposite open ends where the expansion waves reflect and the resultant pressure waves 16a, 16b intersect at point 18 within the combustion chamber.

In a conventional pulse-jet fuel is either continuously supplied to the combustion chamber at a constant rate for the period of time between point 10 and point 18, or the fuel supply rate is allowed to fluctuate due to the oscillating pressure in the combustion chamber. As the inlet is of a smaller length to that of the tail pipe air is drawn into the combustion chamber and mixes with the fuel. At point 18, where the pressure waves intersect the pressure within the combustion chamber is at a maximum and induces ignition in the air/fuel mixture. This creates a further pressure wave and the cycle 10 to 18 repeats.

Figure 3:
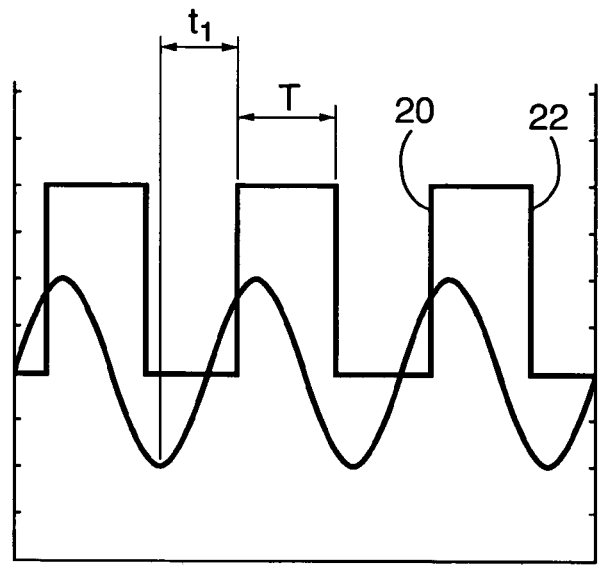
FIG. 3 depicts the pressure fluctuations in the combustor chamber and fuel pulse delay

The combustion chamber is acoustically resonant and the aero-thermal-acoustic operation of the pulse combustor causes the combustion to naturally oscillate at around 200 Hz. The unsteady pressure within the combustion chamber oscillates as a sinusoidal variation, as shown in FIG. 3 which, with a continuous supply of fuel gives rise to a constant RMS unsteady pressure within the combustion chamber as shown as the double line in FIG. 4.

In accordance with the invention fuel is pulsed into the combustor at the same frequency as the combustion process. The pressure of the combustion chamber is measured and a feedback circuit couples the sensor with the fuel injector.

The efficiency of the combustion process is governed by how heat is added to a volume of gas. When the heat is added in a non-steady manner to a volume of gas experiencing unsteady pressure fluctuations the mechanical energy content of the volume of the gas can be increased.

The temporal phase angle between the unsteady pressure fluctuations and the unsteady heat addition is minimised to increase the conversion of chemical energy into mechanical energy. The temporal phase angle is minimised through selectively varying the timing, duration and amplitude of unsteady fuel injection into the combustion chamber.

FIG. 3 further depicts the unsteady pressure fluctuations with the pulses of fuel injected at the frequency of the combustion process. A fuel injector allows injection to begin at the rising edge 20 and terminates injection at the falling edge 22 a time period T later which, in this example corresponds to ½ the duty cycle. The rising edge of the fuel pulse is positioned at a time delay $t_1$ which corresponds to a phase angle from the minima of the of the sinusoidal pressure fluctuation within the combustor By correctly controlling the timing, duration and/or amplitude of the fuel injection, the conversion of chemical energy into mechanical energy is increased. If the timing, duration and/amplitude of the fuel injection is incorrectly controlled the conversion of chemical energy into mechanical energy is reduced.

Figure 4:
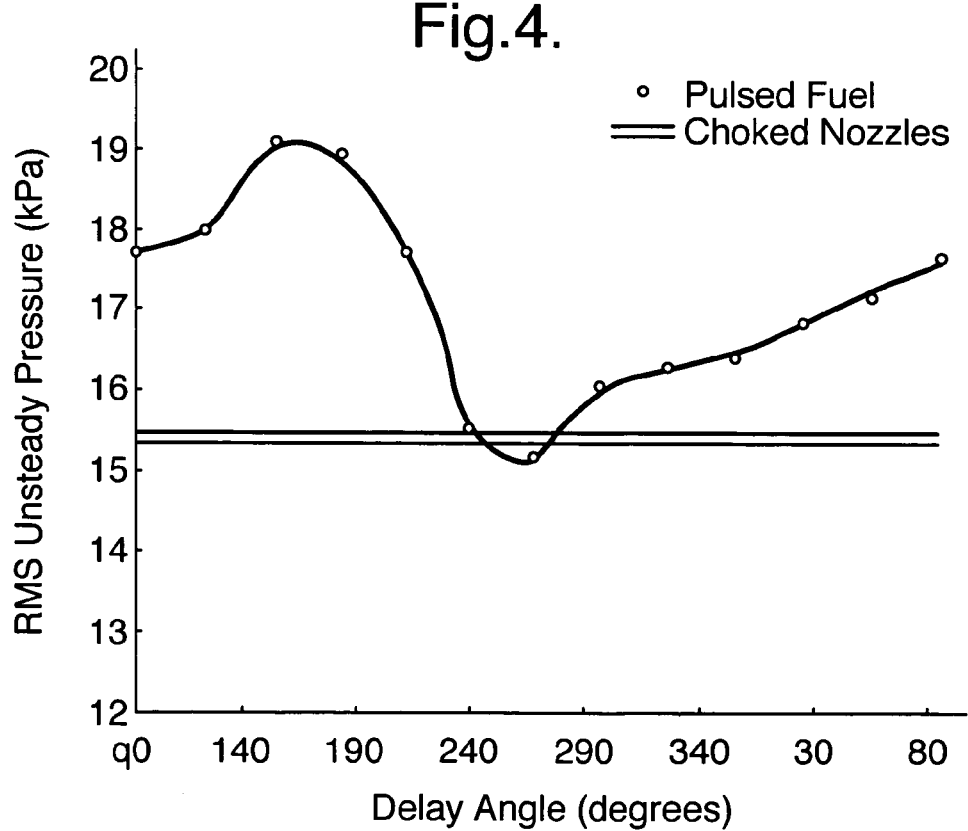
FIG. 4 is a graph of RMS unsteady pressure fluctuation for a pulsed flow and a continuous flow

FIG. 4 depicts a graph of RMS unsteady pressure in the combustor against phase angle delay where fuel is pulsed into the combustor at a rate equivalent to 1.6 g/s for a period equivalent to ½ the duty cycle. Also plotted is the RMS unsteady pressure observed for a fuel flow into the combustor at a continuous rate equivalent to 1.6 g/s.

It may be observed from the graph that pulsing the fuel flow provides an increase to the RMS unsteady pressure especially where the phase angle is between 0° and 210°. Between a phase angle $t_1$ of 90° and 210° the RMS unsteady pressure is approximately 4 kPa greater than the RMS unsteady pressure of the pulse jet having a continuous injection of fuel throughout the duty cycle. The increase equates to an increase in mechanical energy produced by the combustor of approximately 27% over that where the fuel is fed into the chamber at a constant rate The amplitude of the RMS unsteady pressure is indicative of the quantity of mechanical energy stored in the acoustic wave.

A pressure sensor 55 measures the pressure within the combustor and the amplitude and phase of the fuel injection is varied in accordance with the measured pressure via a feedback circuit 77, as shown in FIG. 1, with the fuel being injected a time period $t_1$ after the measured pressure is sensed by the pressure sensor 55. Alternatively, an external driver controls the fuel injector. There may be one or many fuel injectors at the same or different axial locations.

The RMS unsteady pressure may be further increased by reducing the length of time within the over which the fuel is injected.

The results in the exemplified system was obtained from a valve-less pulse jet. Inlet had a length 140 mm and inside diameter 39 mm, the combustion chamber a length 145 mm, and inside diameter 75 mm giving a combustor volume of 640 cc. The tail pipe had a length 945 mm and was tapered from an initial inside diameter of 22.5 mm to an exit inside diameter of 60 mm.

The fuel injector was one suitable for a car and periodically injected fuel at a rate of 1.6 g/s. The front end of the combustion chamber is defined by a tapered combustor head and four injectors were arranged at a 90° spacing.

Initial ignition is effected by a spark plug located part way along the combustion chamber.

Whilst the present invention has been described with respect to a valve-less pulse jet, the invention is also applicable to pulsed combustors used in a gas turbine. The partial conversion of thermal energy to mechanical energy beneficially allows the pressure of the hot gas entering the turbine to be increased above the pressure of the gas entering the combustor i.e. there is no pressure loss in the combustor. The increased pressure of gas entering the turbine allows more work to be done on the turbine and thus improves on the efficiency of the overall engine. Improved efficiency lowers fuel costs and the cost of running the engine.

Pulse jets may be used on their own or as part of a propulsion system e.g. as a reheat system, thrust augmenter or VTOL system.

A gas turbine incorporating the invention may be used in power generators, pumping systems or marine propulsion as well as aircraft propulsion.

The pulsed combustor may also be applied in waste incineration and micro combined heat and power systems.

We claim:

1. A thermo acoustic pressure rise combustor comprising:
    an air inlet;
    an air outlet;
    a combustion chamber; and
    an associated fuel injector from which in use fuel is injected into the combustor chamber in pulses, the combustor chamber in use exhibiting a cyclical pressure fluctuation having a pressure rising portion and a pressure falling portion induced by deflagration of the fuel, the timing of the start of the pulse of fuel being in a phase relationship with the pressure rising portion, wherein the cyclical pressure fluctuation is sinusoidal, the pressure rising portion starting at the minima of the sinusoidal pressure fluctuation and extending to the maxima of the sinusoidal pressure fluctuation, the pressure falling portion starting at the maxima of the sinusoidal pressure fluctuation and extending to the minima of the sinusoidal pressure fluctuation, wherein the timing of the start of the pulse of fuel is phased from the minima by between 0 degrees and 210 degrees.

2. A thermo acoustic pressure rise combustor according to claim 1, wherein the fuel is pulsed at the same frequency as the pressure fluctuations.

3. A thermo acoustic pressure rise combustor according to claim 1, wherein the timing of the start of the pulse of fuel is phased from the minima by between 90° degrees and 210° degrees.

4. A thermo acoustic pressure rise combustor according to claim 1, wherein the timing of the end of the pulse of fuel is phased from the timing of the start of the pulse of fuel by a phase angle of between 30° degrees and 180° degrees.

5. A thermo acoustic pressure rise combustor according to claim 1, wherein a phase delay of the timing of the start of fuel injection varies between cycles.

6. A thermo acoustic pressure rise combustor according to claim 1, further comprising pressure sensing means for sensing the pressure within the combustor chamber.

7. A thermo acoustic pressure rise combustor according to claim 6, wherein the pressure sensor is functionally connected to the fuel injector such that fuel is pulsed in response to a sensed pressure value within the combustor casing.

* * * * *

UNITED STATES PATENT AND TRADEMARK OFFICE
CERTIFICATE OF CORRECTION

PATENT NO. : 7,637,096 B2  Page 1 of 1
APPLICATION NO. : 11/262930
DATED : December 29, 2009
INVENTOR(S) : Razzell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1093 days.

Signed and Sealed this

Ninth Day of November, 2010

David J. Kappos
*Director of the United States Patent and Trademark Office*